Jan. 22, 1963 J. DUNAY 3,075,102
OSCILLATORY MOTOR
Filed Feb. 23, 1960

INVENTOR.
JOHN DUNAY
BY
ATTORNEY

United States Patent Office 3,075,102
Patented Jan. 22, 1963

3,075,102
OSCILLATORY MOTOR
John Dunay, New Milford, N.J., assignor to Ideal Mechanisms, Inc., Long Island City, N.Y., a corporation of New York
Filed Feb. 23, 1960, Ser. No. 10,195
1 Claim. (Cl. 310—39)

This invention relates to improvements in oscillatory motors, such as, for example, the oscillatory motors intended primarily for actuating a toy or display device used for advertising purposes, and wherein a movable part of the device is given a continuing oscillatory movement by the operation of the motor.

Although oscillatory motors presently exist, and are used for operating toys or display devices, such motors are made up of a relatively large number of parts and involve rather tedious assembling procedures, so that the existing oscillatory motors are relatively expensive and thus have found only limited use in display devices intended for advertising purposes where the cost of the display device is frequently of paramount importance.

Accordingly, it is an object of the invention to provide an oscillatory motor made up of a minimum number of easily produced parts which can be quickly assembled in a particularly convenient and easy fashion in order to permit a significant lowering of production costs and thereby promote the increased use of such motors in the actuation of display devices intended for advertising purposes.

In accordance with an aspect of the invention, an oscillatory motor includes a one-piece frame member stamped out of sheet metal and formed with integral projections forming the bearings for the pivotal support of an oscillatory member which is also stamped out of sheet metal and which carries a permanent magnet movable along an arcuate path, and the one-piece frame member also serves as a support for a dry-cell battery and for a solenoid which is disposed adjacent the arcuate path of travel of the magnet and indented to be intermittently energized from the battery under the control of contacts carried by the frame member and oscillatory member, respectively, thereby to repel the permanent magnet and impart repeated impulses to the oscillatory member for continuously effecting the swinging movements of the latter.

In accordance with another aspect of the invention, the bearings provided on the one-piece frame member for the pivotal mounting of the oscillatory member are in the form of oppositely directed pointed projections engageable in generally conical recesses opening toward each other in parallel portions of the oscillatory member which have inherent resiliency, and the frame member further has a cut-out between the portions thereof carrying the pointed projections so that such portions of the frame member and of the oscillatory member are capable of being sprung toward and away from each other, respectively, in order to facilitate the engagement of the pointed projections in the recesses of the oscillatory member during assembly of the motor.

The above, and other objects, features and advantages of the invention, will be apparent in the following detailed description of an illustrative embodiment thereof which is to be read in connection with the accompanying drawing forming a part hereof, and wherein.

Figure 1:
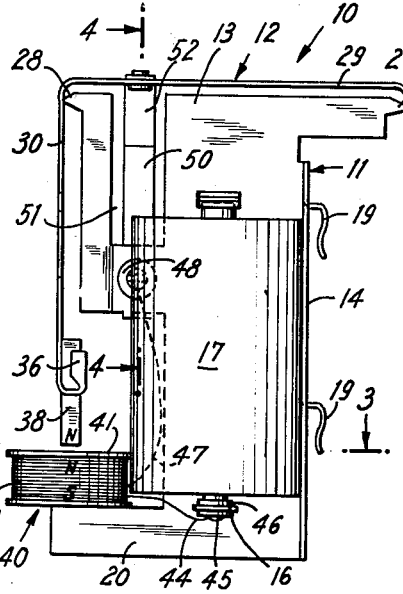
FIG. 1 is a front elevational view of an assembled oscillatory motor embodying the present invention.

Referring to the drawing in detail, and initially to FIGS. 1 and 2 thereof, it will be seen that an oscillatory motor embodying the present invention, and there generally identified by the reference numeral 10, includes a stationary, one-piece frame member 11, and an oscillatory member 12 which is pivotally mounted on frame member 11, as hereinafter described in detail, with both the frame member 11 and the oscillatory member 12 being designed and constructed so that they can be conveniently and inexpensively stamped, cut and bent from sheet metal.

Figure 5:
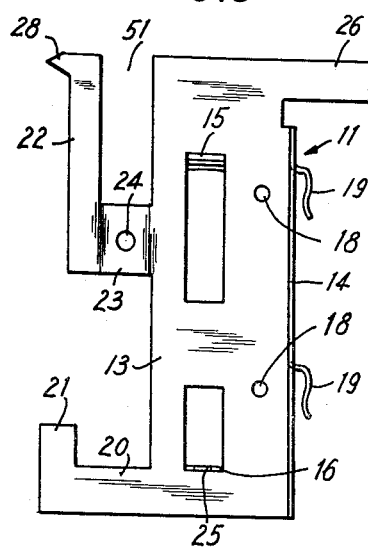
FIG. 5 is a front elevational view of a frame member included in the motor.

As shown in FIG. 5, the one-piece frame member 11 includes a vertically elongated, generally rectangular body 13 having a flange 14 extending at right angles thereto along substantially the entire length of one of its side edges. Upper and lower tabs 15 and 16 are struck forwardly out of the body 13 and are spaced vertically apart by a suitable distance so as to accommodate a dry-cell battery 17 therebetween, as in FIG. 1. The body 13 is further formed with suitably located holes 18, and generally downwardly directed tabs 19 are struck from side flange 14, so that the holes 18 or tabs 19 can be selectively employed for use in the stationary mounting of frame 11 upon a fixed portion of an advertising display, toy or the like which is to be actuated by the oscillatory motor 10.

The one-piece frame member 11 further has a leg 20 extending laterally from the bottom of body 13 in the direction away from side flange 14 and terminating in an upwardly directed foot 21. An elongated extension 22 extends parallel to, and is spaced laterally from the upper portion of body 13 at the side of the latter remote from flange 14 and lies generally in the plane of the body 13, with the lower end of extension 22 being integrally attached to the adjacent side edge of body 13 by a connecting portion 23 which is offset forwardly from the plane of body 13 and extension 22, as is apparent in FIG. 4. A hole 24 is formed in connecting portion 23, and a similar hole 25 is formed in the tab 16 struck out of body 13, with the holes 24 and 25 being intended to receive insulated terminals, as is hereinafter described in detail.

The one-piece frame member 11 is completed by an extension 26 directed laterally from the upper end of body 13 over the top edge of flange 14 and terminating in a pointed projection 27, and by a similar pointed projection 28 extending from the upper end of extension 22 in the direction opposed to that of the pointed projection 27.

Figure 2:
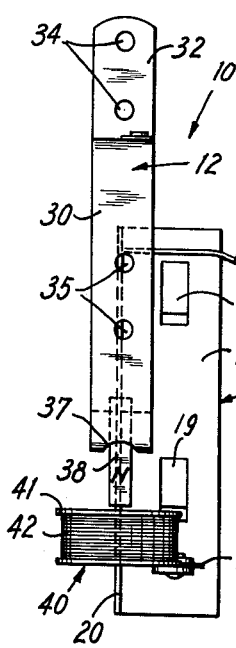
FIG. 2 is a side elevational view of the motor of FIG. 1.

Referring now to FIGS. 1 and 2, it will be seen that the oscillatory member 12 is bent from an elongated strip of sheet metal so as to include a cross-piece 29, and a relatively long arm 30 and a short arm 31 extending downwardly from the opposite ends of cross-piece 29 substantially at right angles to the latter. The cross-piece 29 is dimensioned so that the distance between the inner surfaces of arms 30 and 31 is normally less than the normal distance between the points of projections 27 and 28. The lower end of relatively short arm 31 is integrally attached to the lower end of an upwardly directed extension 32 by a lateral portion 33, and the upwardly directed extension 32 and the downwardly directed, relatively long arm 30 are formed with holes 34 and 35, respectively, by which the oscillatory member 12 can be suitably attached to a movable part of the advertising display or toy which is to be actuated by the motor 10.

The lower end of relatively long arm 30 is bent inwardly and upwardly, as at 36 (FIG. 1), and is formed with an opening 37 (FIG. 2) through which a permanent bar magnet 38 can project downwardly, with the upwardly bent portion 36 being crimped or clamped against the upper portion of magnet 38 in order to securely hold the latter in assembled relationship to the oscillatory member 12.

Figure 6:
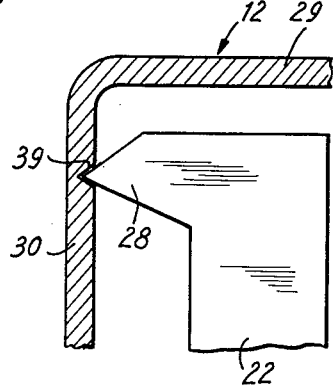
FIG. 6 is an enlarged, fragmentary sectional view illustrating the pivotal mounting of an oscillatory member on the frame member in the motor embodying the invention.

The inner surfaces of arms 30 and 31 are formed with small conical recesses 39 (FIG. 6) opening toward each other and at equal small distances below cross-piece 29. Such recesses 39 may be suitably formed by a center punch or other similar tool and are intended to receive the pointed projections 27 and 28 for pivotally mounting the oscillatory member on frame member 11.

The various portions of oscillatory member 12 are dimensioned so that, when the latter is mounted on frame member 11 for pivoting about an axis extending through pointed projections 27 and 28, permanent magnet 38 secured in the free end of arm 30 is movable along an arcuate path which passes closely adjacent the upstanding foot 21 of the frame member at the point along such path corresponding to the vertical or dead center position of arm 30.

Figure 3:
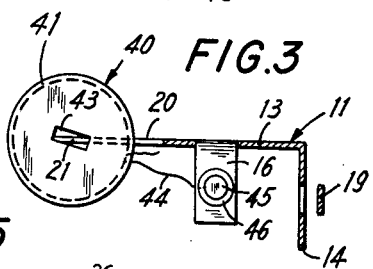
FIG. 3 is a horizontal sectional view taken along the line 3—3 of FIG. 1.

A solenoid 40 is mounted on the foot 21 of frame member 11 and includes a spool 41 of insulating material having a conducting winding 42 thereon. The spool 41 has an opening 43 of rectangular cross section extending therethrough (FIG. 3), with the rectangular opening 43 being dimensioned so that the foot 21 has a pressed or forced fit therein when extending diagonally cross the opening, whereby the spool 41 is frictionally held on the foot 21 and is held against rotation, while the foot 21 also functions as a core for the winding 42. As is apparent in FIGS. 1 and 2, the winding 42 of solenoid 40 has its axis extending vertically, and the winding 42 is energized so that the lower end of permanent magnet 38 and the upper end of the magnetic field established by the winding 42 are of the same polarity, whereby such magnetic field repels the magnet supported by arm 30 of the oscillatory member 12.

It will be apparent that the relatively long arm 30 of oscillatory member 12 acts as a pendulum, and energization of winding 42 of solenoid 40 is controlled so that the magnetic field is established as the pendulum swings past its central or dead center position, thereby to provide an impulse for continuing the swinging movement of the oscillatory member.

In the illustrated embodiment of the invention, a wire 44 extending from one end of winding 42 is soldered to a terminal 45 which is in the form of a rivet extending through a rubber insulating grommet 46 located in the hole 25 of tab 16 of the frame member, so that the rivet 45 is adapted to make electrical contact with the casing or outer electrode of the dry-cell battery 17, while the central electrode of the battery is engaged by the upper tab 15 of the frame member and thus electrically connected to the latter. A wire 47 extending from the opposite end of winding 42 is soldered to a rivet 48 (FIG. 4) which extends through a rubber insulating grommet 49 located in the hole 24 of connecting portion 23 of the frame member, and the rivet 48 also secures the lower end of a leaf spring contact 50 which is insulated by the grommet 49 from the portion 23 of the frame member and projects upwardly therefrom into a space 51 defined between extension 22 and the adacent side edge of body 13.

Figure 4:
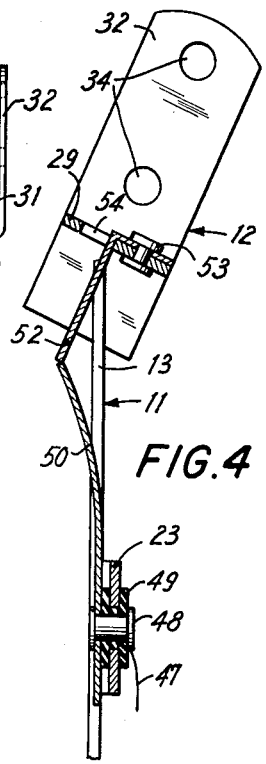
FIG. 4 is an enlarged, fragmentary sectional view taken along the line 4—4 of FIG. 1, but showing the oscillatory member of the motor in another position during the operating cycle.

The leaf spring contact 50 is adapted to be intermittently engaged by a contact 52 which is movable with the oscillatory member 12, and which, as is apparent in FIG. 4, is in the form of an angle member having one leg secured on the top surface of cross-piece 29, as by a rivet 53, while its other leg projects downwardly through an opening 54 in cross-piece 29 and reaches into the space 51.

The movable contact 52 is dimensioned so that, when the oscillatory member 12 is in its neutral or central position, that is, with relatively long arm 30 extending vertically, the lower end edge of contact 52 extends slightly below the upper end edge of leaf spring contact 50. Thus, when the oscillatory member 12 reaches that neutral or central position during oscillation or swinging movement thereof, contact 52 engages contact 50 to complete or close the energizing circuit for winding 42 of the solenoid through oscillatory member 12 and frame member 11. The inertia of the oscillatory member 12 causes magnet 38 to swing past its bottom dead center position, and the energized winding 42 creates the magnetic field which repels magnet 38 and thereby imparts an impulse for urging the oscillatory member to swing further beyond its neutral or central position. During the initial swinging of the oscillatory member past its neutral or central position, movable contact 52 continues in engagement with leaf spring contact 50 while the latter flexes, as illustrated in FIG. 4, until the lower end edge of contact 52 can slide over the upper end edge of contact 50 and be disengaged from the latter for interrupting the energizing circuit of the winding 42. The inertia of the oscillatory member 12 then carries the magnet 38 to the limit of its swinging movement, whereupon the force of gravity acts on arm 30 and magnet 38 to cause the return swinging movement thereof toward the bottom dead center position where the winding 42 is again energized by closing of the contacts 50 and 52. From the foregoing, it is apparent that, once the swinging movement of oscillatory member 12 is manually started, the solenoid 40 will impart impulses for continuing such swinging movement so long as battery 17 is installed between upper tab 15 and terminal 45 carried by the lower tab 16, and that the making and breaking of the electrical circuit for energizing winding 42 of the solenoid are controlled by the swinging movements of oscillatory member 12.

It will be appreciated that the one-piece frame member 11 of the oscillatory motor 10 embodying the present invention performs the multiple functions of supporting battery 17 and solenoid 40, of providing the bearings 27 and 28 by which the oscillatory member 12 is pivotally mounted on the frame member, of supporting the stationary contact 50 included in the electrical circuit for energizing the solenoid while also forming a part of that electrical circuit, and of providing the means, for example, the holes 18 and the tabs 19, by which the frame member is mounted upon a fixed part of the display, toy or the like to be actuated by the motor. Further, by reason of the arrangement of frame member 11, which provides one of the bearings 28 in the form of a pointed projection on an extension 22 which is attached to body 13 only at its lower end and with a space 51 being provided between extension 22 and the adjacent side edge of body 13, a lateral force applied to extension 22 causes the pointed projection 28 to be resiliently displaced toward the other pointed projection 27 to reduce the distance between the points of projections 27 and 28 and thereby permit such pointed projections to fit between the inner surfaces of the arms 30 and 31 of oscillatory member 12 until such pointed projections are registered with the conical recesses 39, whereupon the lateral force exerted on extension 22 can be released and projections 27 and 28 enter recesses 39 for holding the oscillatory member in assembled position on frame member 11.

It will also be appreciated that the oscillatory member 12 performs the multiple functions of supporting magnet 38 and contact 52 of the electrical circuit for energizing winding 42 of solenoid 40, of forming a part of that electrical circuit, and of providing the means, for example, the openings or holes 34 and 35, by which the oscillatory member can be attached to the part of the display, toy or the like which is to be actuated.

It will also be seen that the above mentioned multiple functions of frame member 11 and oscillatory member 12 are achieved with constructions that are susceptible to forming by stamping, cutting and bending from sheet metal, which forming procedures are notoriously inexpensive, thereby to permit substantial reduction in the manufacturing costs of oscillatory motors.

Although an illustrative embodiment of the invention has been described in detail herein with reference to the accompanying drawing, it is to be understood that the invention is not limited to that precise embodiment, and that various changes and modifications may be effected therein without departing from the scope or spirit of the invention, except as defined in the appended claim.

What is claimed is:

An oscillatory motor comprising a one-piece sheet metal frame member of magnetic material including an upstanding body having spaced apart tabs struck therefrom to support a dry-cell battery therebetween, a first pointed projection extending laterally from one side of said body at the top of the latter, an upwardly directed extension spaced from the other side of said body along the upper portion of the latter and joined to said body only at the lower end of said extension so as to be flexible toward said upper portion of the body, a second pointed projection directed laterally from the upper end of said extension in the direction opposed to said first pointed projection, and a laterally directed extension joined to said other side of the body at the bottom of the latter and terminating in an upwardly directed foot which is spaced from said lower end of the upwardly directed extension to define an air-gap therebetween; an oscillatory member including a cross-piece and arms depending from the opposite ends thereof, said arms having recesses in their inner surfaces receiving said pointed projections for pivotally mounting said oscillatory member on said frame member, the one of said arms having the recess receiving said second pointed projection being relatively long and carrying a permanent magnet at its free end moving along an arcuate path passing through said air-gap; a solenoid mounted on said foot so that the latter constitutes a core for the solenoid and said frame member forms a closed magnetic circuit for the magnetic field established by said solenoid upon energization of the latter; and electric circuit means for energizing said solenoid from a battery carried by said tabs of the frame member, said circuit means including fixed and movable contacts respectively carried by said frame member and oscillatory member between said body of the frame member and said upwardly directed extension of the latter and engageable intermittently to energize said solenoid so that the latter imparts an impulse for urging said magnet to move along said path.

References Cited in the file of this patent
UNITED STATES PATENTS

| | | |
|---|---|---|
| 2,747,114 | Reitz | May 22, 1956 |
| 2,781,462 | Wheeler | Feb. 12, 1957 |
| 2,810,083 | Dunay | Oct. 15, 1957 |